United States Patent [19]

Bischoff

[11] 4,153,748

[45] May 8, 1979

[54] WEATHER-RESISTANT VULCANIZABLE COVERING

[75] Inventor: Dieter Bischoff, Fürth, Fed. Rep. of Germany

[73] Assignee: Firma Carl Freudenberg, Weinheim, Fed. Rep. of Germany

[21] Appl. No.: 808,412

[22] Filed: Jun. 20, 1977

[30] Foreign Application Priority Data

Jun. 25, 1976 [DE] Fed. Rep. of Germany ....... 2628741

[51] Int. Cl.² ................................................. B32B 3/00
[52] U.S. Cl. ........................................ 428/57; 428/61; 428/62; 428/58; 428/517; 428/519; 428/520; 428/494; 428/451; 156/305
[58] Field of Search ...................... 428/57, 61, 62, 58, 428/517, 519, 520, 494, 451

[56] References Cited

U.S. PATENT DOCUMENTS

| | | | |
|---|---|---|---|
| 2,713,017 | 7/1955 | Bruns | 428/57 |
| 3,292,334 | 12/1966 | Craig | 428/57 |
| 3,364,100 | 1/1968 | Danielson | 428/494 |
| 3,403,072 | 9/1968 | Wheat | 428/517 |
| 3,616,130 | 10/1971 | Rogosch | 428/517 X |
| 3,660,224 | 5/1972 | Cau et al. | 428/517 X |
| 3,927,233 | 12/1975 | Naidoff | 428/58 |

*Primary Examiner*—P. C. Ives
*Attorney, Agent, or Firm*—Sprung, Felfe, Horn, Lynch & Kramer

[57] ABSTRACT

A weather-resistant covering is made of three superimposed sheets of vulcanizable material such as ethylene-propylene copolymers, e.g. ethylene-propylene-diene terpolymer. The inner layer contains a vulcanization accelerator and advantageously the outer layers do not. An additional inner layer such as a non-woven textile fabric can be provided to increase strength and dimensional stability. A roof can be covered by placing a plurality of strips of such covering side-by-side with slight overlap, welding them together into impervious seams by application of a volatile solvent or swelling agent for the outer layers.

7 Claims, No Drawings

WEATHER-RESISTANT VULCANIZABLE COVERING

The invention relates to a covering of vulcanizable material, resistant to the effects of water and the atmosphere, and also resistant to temperature for long periods of time.

Coverings of the type described hereinabove are used to seal roofs, especially flat roofs, in civil engineering, and generally wherever penetration of water is to be prevented or the effects of unfavorable weathering are to be excluded.

It has already been known for a long time to seal areas, for example roofs, with tar paper and bitumen-plastic strips. In the latter case, the properties of the asphalt are improved by the plastic additives.

Coverings, e.g., roofing materials, made of plastic are also used. In this connection, special mention should be made of thermoplastic products based on, for example, polyvinyl chloride, polyisobutylene, acrylic polymers, acrylic polymers modified with bitumen, and polyethylene-asphalt combinations. Vulcanizable products based on chloroprene rubber, chlorosulfonated polyethylene rubber, and butyl rubber are also used.

However, all of the groups of products mentioned hereinabove exhibit to a greater or lesser degree certain disadvantages, especially relating to shelf life, resistance to external, especially temperature influences, and the complexity of the methods of their application. If they are not applied exactly, there is a danger that there will be more or less serious leaks at the seams.

Thus, the advantages of asphalt strips lie in their simple workability, but the cold-warm behavior of asphalt has a particularly disadvantageous effect upon the seams. The asphalt becomes brittle when cold and begins to flow when hot, so that leaks unavoidably develop.

Plastic strips of a thermoplastic nature can be applied flawlessly by welding them along the seams, but these coverings have all of the disadvantages of thermoplastics, such as cold flow and softening when warm. There is also the danger of perforation of the covering by pebbles, or other types of mechanical damage.

Vulcanized films can be applied only at considerable cost because the manufacture of a good and permanently sealed seam is difficult. For this reason, only chlorosulfonated polyethylene films have proven to be useful in practice, occupying an intermediate position between thermoplastically workable and vulcanizable materials. Roofing films made of chlorosulfonated polyethylene must be fully cured after being applied to the roof, so that it is still possible to seal the seams by welding. However, the chlorosulfonyl group is sensitive to water, so that there is a danger of premature full curing during storage.

Polyvinyl chloride films and strips are likewise thermoplastically workable and can be joined simply and reliably by swell-welding. However, migration of the plasticizer is disadvantageous. PVC strips cannot be used in the presence of asphalt, so that for example it is impossible to repair asphalt roofs using PVC films.

Covering films and roofing materials based on ethylene-propylene rubber copolymers (EPM), including ethylene-propylene terpolymers with dienes (EPDM) have been known for some time. The EPDM-based strips are characterized by high elasticity, resistance to weathering, and particularly by compatibility with asphalt. It is known, however, that products based on olefinic hydrocarbons can be joined with difficulty if at all, especially when they are vulcanized. As a result the EPDM strips, otherwise very advantageous, cannot produce reliable seams because there is always the danger of leaks.

Therefore, strips are commercially available for cementing purposes, but their use on construction sites is inconvenient and time-consuming. The strips age and become brittle with time, so that EPDM strips are used only to a limited extent.

The goal of the invention is to develop a covering which is resistant to temperature, water and weather, has a good shelf life, and can be worked, applied and sealed without difficulty. Hence, the covering should combine the advantages of an elastomer strip with those of thermoplastic strips. At the same time, a problem-free seam must be provided at any point in the covering or strip.

A covering made of vulcanizable material is proposed, resistant to the action of water and weather, characterized by the fact that it consists of a plurality of flat structures, e.g., films, connected together, whereby at least one elastomeric inner layer is provided, said layer containing a vulcanization accelerator known of itself, together with at least one upper and lower outer layer, whereby all of the flat structures are vulcanizable and at least the outer layers can be welded thermally and/or by solvents. A multi-layered structure of this kind has proven to be particularly advantageous, with the films forming the layers being connected together permanently by vulcanization. The outer layers should advantageously be free of vulcanization accelerator.

The covering according to the invention is therefore designed so that a vulcanizable inner layer consisting of films comprising one or more vulcanization accelerators is combined with at least two, i.e., one upper and one lower outer layer, which are not accelerated but are likewise vulcanizable. All of the layers are firmly bonded together by an appropriate device, e.g., a vulcanizing machine. The mixtures are advantageously adjusted so that the outer layers which are not accelerated are affected by the accelerator component of the inner layer and are therefore chemically bonded to the inner layer. Separation of the layers, even at higher temperatures such as 80°–100° C., for example, is not possible. By an appropriate composition or structuring of at least one of the flat structures to be bonded together, e.g., the inner layer containing the vulcanization accelerator, the covering is able to be after-cured during use or after application, e.g., as roofing material. This results in a considerable improvement in the characteristics in use of the material.

In general, it can be stated that the properties of the covering are determined primarily by the inner layer, which is elastic and vulcanizable, and contains the vulcanization accelerator. As a result, the multi-layered structure is also elastic and exhibits no cold flow. Even at higher temperatures, 80°–100° C., for example, and when applied vertically, the strip will not creep. Hence, the covering can even be applied vertically, for example as flashing around domelights, ventilating pipes, and the like.

It is also important that the outer layers are weldable thermally and/or with the aid of solvents, whereby it is generally preferred for these outer layers to be free of vulcanization accelerator. Both the inner layers and the outer layers consist of vulcanizable material, advantageously based on EPDM, which is preferred as a rule. Cutting materials made of EPDM and EPM have also proven advantageous for the outer layers. Additional suitable vulcanizable materials include, for example, chloroprene rubber, chlorosulfonated polyethylene rubber, butyl rubber, and the like.

Long-term tests have shown that coverings according to the invention, at temperatures of 80°–100° C., as can occur for example under the influence of intensive solar radiation on flat roofs, undergo an improvement in their properties due to the after-curing which takes place during use, already mentioned above. This after-curing affects particularly the seams which are so sensitive in conventional coverings. As a result, absolute tightness is ensured even under unfavorable conditions. All welding methods, both thermal and/or those that work with the aid of solvents, can be used to apply the covering according to the invention. However, a particularly advantageous method has been found which is also a subject of the invention. In this method, sections are laid side by side so that they overlap, in a known manner, and the seams are then permanently welded together by means of an appropriate solvent or mixture of solvents, which advantageously contains a vulcanization accelerator, forming a bond which is impermeable, mechanically and thermally strong, being formed after the solvent or solvents evaporate.

The covering according to the invention can be applied without limit at normal temperatures, for example up to 25° C. It is also resistant against higher temperatures acting for a short period of time, as may occur for example during transport. Even in this case, the properties are not changed, i.e., the strip remains weldable.

The swell-welding used in the method according to the invention for applying the strips results in a minimum cost to the individual applying the material, e.g., the roofer.

The proposed addition of vulcanization accelerator to the solvent (swell-welding agent) increases the chances that a tight seam will be produced, as a result of the gradual vulcanization or after-curing of the strip at the seam to a degree which has not been achieved heretofore.

Surprisingly, it has been found that the seam can be fully loaded immediately after being applied, i.e., directly after the solvent has evaporated completely, and its tightness is not affected by high temperatures. A seam two days old was tested for example 8,000 times in water at 80° C. in a Bally penetrometer, without its tightness being affected thereby.

The resistance of the covering, as is desired in many cases, can be increased by providing an additional internal layer of non-woven or woven surface structures made of textile material or glass fibers or the like.

Nearly unlimited application is possible in view of the fact that the covering according to the invention is compatible with asphalt.

The example below shows a covering sheet produced according to the invention.

EXAMPLE

Initially, a blank 0.3–1.5 mm thick, preferably 0.6–0.7 mm thick, was formed, having the composition described hereinbelow under A. In addition, two blanks of composition B, approximately 0.5 mm thick, were formed. All three layers were vulcanized together by an automatic vulcanizing machine thus being combined into a three-layered structure. Naturally, more than three layers can be vulcanized together or, if particular stiffness is required, a flat structure made of a woven or non-woven material can be provided between layers A and B. Only the elongation and elasticity of the covering strip is adversely affected thereby. The mechanical properties are improved.

|  | A | B |
|---|---|---|
| EPDM (ethylene propylene diene terpolymer) | 100.00 parts by wt. | 100.00 parts by wt. |
| Carbon black | 120.00 parts by wt. | 120.00 parts by wt. |
| Naphthenic oil | 60.00 parts by wt. | 60.00 parts by wt. |
| ZnO | 5.00 parts by wt. | 5.00 parts by wt. |
| Stearic acid | 1.00 parts by wt. | 1.00 parts by wt. |
| Age resistor | 2.50 parts by wt. | 2.50 parts by wt. |
| Tetramethylthiuram disulfide | 1.00 parts by wt. | — |
| 2-mercapto-benzothiazole | 1.00 parts by wt. | — |
| Zinc diethyl dithiocarbamate | 2.00 parts by wt. | — |
| Sulfur | 1.50 parts by wt. | — |

The multi-layered structure is resistant to weather effects of all kinds, and is insensitive to temperatures from −40° C. to +100° C. There is no creep or cold flow when it is applied vertically, even at high temperatures.

| Hardness (Shore A) | 65 |
|---|---|
| Thickness | 1.98 mm |
| Weight per unit area | 2,150.0 g/m$^2$ |
| Density | 1.28 g/cm$^3$ |
| Stretch at 100% elongation | 1.4 N/mm$^2$ |
| Tensile strength | 4.1 N/mm$^2$ |
| Elongation at rupture | 590.0% |
| Tear propagation resistance | 12.0 N/mm |
| Resistance to perforation | 131.0 kp |
| Bending tests at −10° C. and −30° C. | no cracks |
| Behavior when exposed to ozone and water | no cracks |
| Change in size at 100° C. after three days | −1% lengthwise, 0% diagonally |
| Tensile strength at 80° C. | 3.74 N/mm$^2$ |
| Slitting pressure test | strip remains tight |

The strip can be bonded without seams using swell-welding agents. A mixture of perchloroethylene and methylene chloride is used as a swell-welding agent, and can also contain 1–2% by weight of vulcanization accelerator. It has already been mentioned repeatedly that this additive increases the reliability of the seams. It is particularly advantageous if 3–4% by weight of ethyl alcohol is added to the mixture of solvents in order to bond water of condensation to the points to be joined.

It will be appreciated that the instant specification and claims are set forth by way of illustration and not limitation, and that various modifications and changes may be made without departing from the spirit and scope of the present invention.

What is claimed is:

1. A covering made of vulcanizable material, resistant to the effects of water and weather, comprising at least three superimposed vulcanizable sheets, at least one inner layer being elastomeric and containing a vulcanization accelerator, at least the outer layers being weldable.

2. A covering according to claim 1, wherein the outer layers are free of vulcanization accelerator.

3. A covering according to claim 1, wherein each of the sheets comprises an ethylene-propylene-diene terpolymer.

4. A covering according to claim 1, wherein at least one inner layer comprises an ethylene-propylene-diene terpolymer, and the upper and lower outer layers comprise a vulcanizable mixture of ethylene-propylene-diene terpolymer and ethylene-propylene copolymer.

5. A covering according to claim 1, including at least one additional inner layer of woven or non-woven textile material.

6. A covering according to claim 1, wherein the outer layers are free of vulcanization accelerator, each of the three sheets comprises an ethylene-propylene-diene terpolymer, the upper and lower outer layers comprise a vulcanizable mixture of ethylene-propylene-diene terpolymer and ethylene-propylene copolymer, and the covering including at least one additional inner layer of woven or non-woven textile material.

7. A covering according to claim 1 in side-by-side overlapping relationship with and welded to a further like cover.

* * * * *